UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

PROCESS OF PRINTING ON METAL.

1,289,215.   Specification of Letters Patent.   Patented Dec. 31, 1918.

No Drawing.   Application filed December 29, 1914.   Serial No. 879,613.

*To all whom it may concern:*

Be it known that I, PAUL MacGAHAN, a citizen of the United States, and a resident of Pittsburgh, in the county of Allegheny and State of Pennsylvania, have invented a new and useful Improvement in Processes of Printing on Metal, of which the following is a specification.

My invention relates to printing processes, particularly to processes of printing upon metal, and it has for its object to provide a process of printing upon metallic surfaces which have been rendered capable of readily receiving printed impressions and permanently retaining them.

I shall describe my process with particular reference to printing upon aluminum plates, but it is to be understood that other metals may also be employed within the scope of my invention. In general, I proceed by mechanically cleansing the surface of the plate, either by sand blasting or by means of etching fluids, and I then produce a dead white surface upon the plate by any one of several chemical processes, after which letter-press or any other desired designs may be applied to the white surface by any ordinary printing apparatus and with ordinary printers' ink.

One method of producing the white printing surface upon aluminum consists in dipping the aluminum plate, after it is sand blasted or otherwise cleansed, into a bath of caustic alkali, such as sodium hydroxid, withdrawing it after a few moments and allowing it to dry.

Another process, which will be found convenient where electric current is available, consists in subjecting the aluminum to the action of an electric current in a solution of water glass. This electrolyte may conveniently be prepared by diluting one part of sodium silicate having a specific gravity of 1.34 with fourteen parts of water, and it may be contained in a small glass or porcelain vessel which is preferably kept cool, either by means of cold running water or by means of cooling coils. Connections should be made to a source of electric current, which may suitably be a 25-cycle, 500-volt line. The plate to be coated is made one of the electrodes of the electrolytic bath, and a series resistance of about 40 ohms is inserted between the plate and the source of current. The resistance should have a current capacity of not less than 5 amperes. The coating equipment is completed by providing a suitable support for the plate to be coated and a second aluminum electrode connected in the electrolytic circuit. Each plate to be coated is first dipped in a hot solution of caustic alkali for a few seconds in order to cleanse its surface, after which it is washed thoroughly in hot water. The cleansed plate is then immersed in the electrolyte and made one of the electrodes, as described above, after which voltage is applied for about thirty seconds. The temperature of the electrolyte is maintained as low as possible and should not be allowed to rise above 60° C. The coated plate is removed from the electrolyte, washed thoroughly and allowed to dry. If desired, a coating of clear lacquer may be applied, but I have found that this darkens the pure white surface somewhat, and I ordinarily prefer to print directly upon the treated surface of the aluminum.

The surface prepared in the manner described above is very smooth and white and readily receives printed impressions. The coating appears to be mainly composed of aluminum oxid, although small amounts of aluminum silicate or free silica may be present.

One advantageous application of my invention is in the manufacture of dials for clocks, meters and similar measuring instruments. The figures may easily be printed with ordinary inks and with the ordinary printing forms and impression apparatus that are employed in the usual processes of printing instrument dials and the like. The printed impressions are exceedingly permanent, inasmuch as the white surface of the metal consists mainly of aluminum oxid, while the printed characters are composed largely of carbon.

I am aware that printed metal articles are not new, but it has heretofore been necessary to paint or enamel the surface of the metal preparatory to printing with ink, or lithographic processes have been resorted to, and coatings of this nature not only are expensive but are likely to become cracked and discolored during use. My process renders such coatings unnecessary, and, since the white surface is formed in a few seconds and from the metal itself, the cost of producing it is very small.

The example of my process detailed above is merely illustrative, and many modifications and variations may readily be devised by persons skilled in the art without departing from the scope of my invention as set forth in the appended claims.

I claim as my invention:

1. A process of printing on metal that comprises forming on the surface of the metal a smooth and even coating adapted to receive printed impressions and composed of a compound of the metal, and printing characters on the said coated surface.

2. A process of printing on metal that comprises forming on the surface of the metal, by chemical reaction, a smooth and even coating composed of a compound of the metal and adapted to receive printed impressions and printing characters thereon.

3. A process of printing on metal that comprises electrolytically forming a coating thereon adapted to receive printed impressions and printing characters thereon.

4. A process of printing on metal that comprises electrolytically forming a coating thereon comprising a compound of the metal and printing characters thereon.

5. A process of printing on aluminum that comprises electrolytically forming a surface coating thereon comprising aluminum oxid and printing characters thereon.

6. A process of printing on aluminum that comprises immersing the aluminum in a solution of a soluble silicate, passing electric current through the said solution, washing and drying the treated aluminum and printing characters thereon.

7. A dial for clocks, meters and the like comprising a sheet of aluminum provided with an integral coating comprising a compound of aluminum and having dial characters printed on the said coating.

8. A dial for clocks, meters and the like comprising a sheet of aluminum provided with an integral coating comprising aluminum oxid and having dial characters printed on the said coating.

In testimony whereof, I have hereunto subscribed my name this 17th day of Dec., 1914.

PAUL MacGAHAN.

Witnesses:
WM. M. BRADSHAW,
B. B. HINES.